March 23, 1926.

C. R. DAVID 1,577,567

TRACTOR CULTIVATOR

Filed Sept. 19, 1923     3 Sheets-Sheet 1

Inventor
C. R. David
By Watson E. Coleman
Attorney

March 23, 1926.

C. R. DAVID
TRACTOR CULTIVATOR
Filed Sept. 19, 1923

Inventor
C. R. David
By Watson E. Coleman
Attorney

March 23, 1926.
C. R. DAVID
1,577,567
TRACTOR CULTIVATOR
Filed Sept. 19, 1923  3 Sheets-Sheet 3
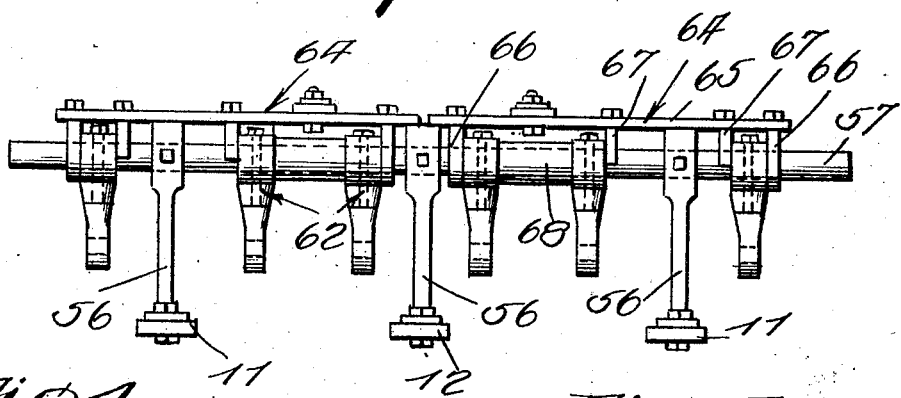
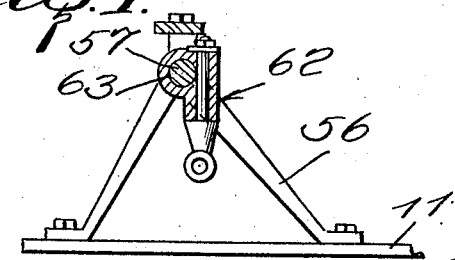
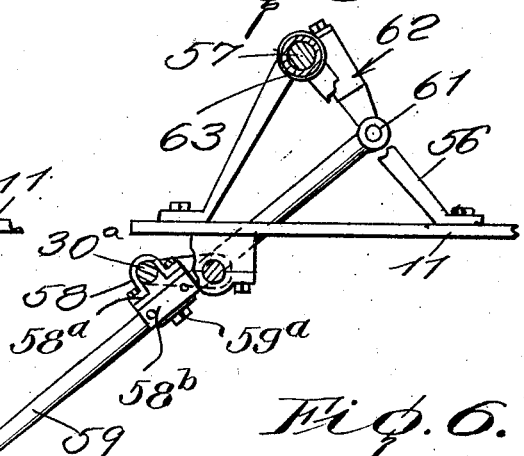
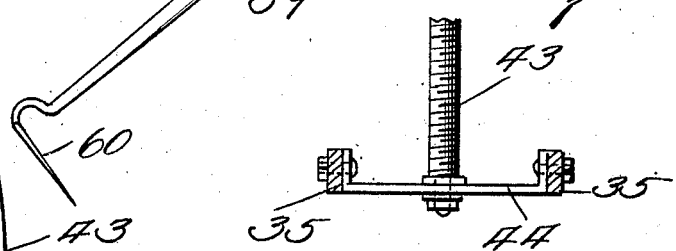
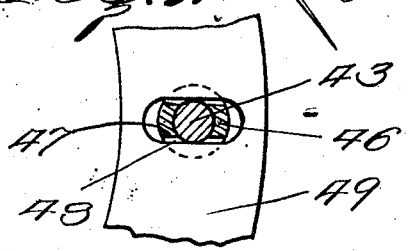

Patented Mar. 23, 1926.

1,577,567

UNITED STATES PATENT OFFICE.

CHARLES R. DAVID, OF TIERNAN, OREGON.

TRACTOR CULTIVATOR.

Application filed September 19, 1923. Serial No. 663,647.

*To all whom it may concern:*

Be it known that I, CHARLES R. DAVID, a citizen of the United States, residing at Tiernan, in the county of Lane and State of Oregon, have invented certain new and useful Improvements in Tractor Cultivators, of which the following is a specification, reference being had to the accompanying drawings.

This invention relates to tractor cultivators and more particularly to a device of this character wherein the tractor and cultivating mechanism are governed by a single operator.

A further object of the invention is to provide a power operated hoe mechanism which may be simply and cheaply constructed and which will be durable and efficient in service.

A further object of the invention is to provide a combined tractor and cultivating apparatus in which the control of operation of both the tractor and cultivator apparatus is accomplished by the feet of the operator.

A still further object of the invention is to provide a device of this character having a plurality of hoes and means for operating the hoes to bring the same into engagement with the ground, the hoes being arranged in gangs and being shiftable to move the same toward or away from a centrally disposed row of plants.

These and other objects I attain by the construction shown in the accompanying drawings, wherein for the purpose of illustration is shown a preferred embodiment of my invention and wherein:—

Figure 3 is a front elevation of a supporting shaft for the upper ends of the hoe shanks;

Figure 4 is a detail sectional view showing the mounting of the bearings on the supporting shaft;

Figure 5 is a detail sectional view showing the complete mounting of the hoe;

Figure 6 is a detail view showing the mounting of the adjustment shaft 43 on the sub-frame; and Figure 7 is a detail view showing the mounting of the adjustment member through the main frame.

Figure 1:
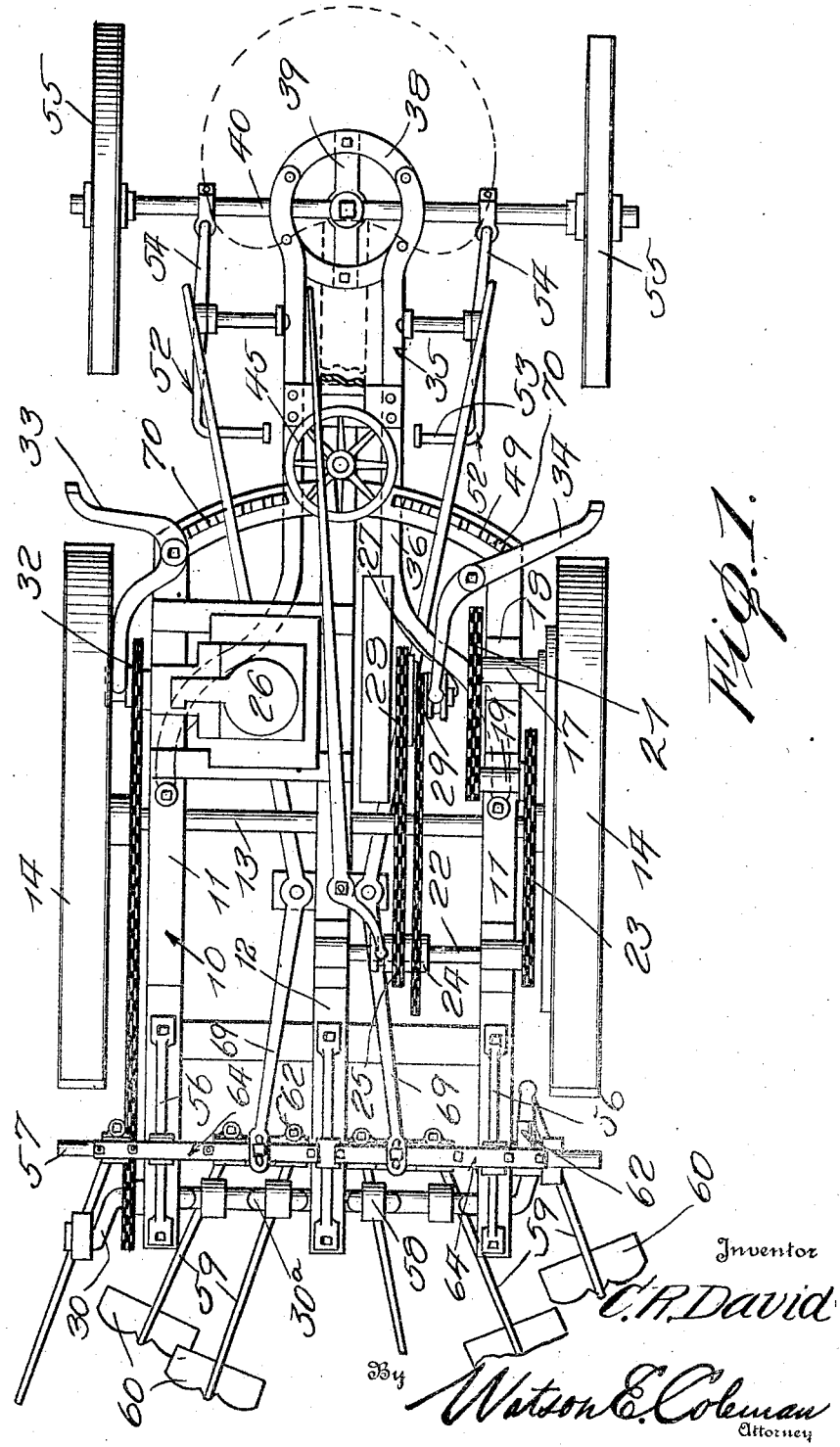
Figure 1 is a plan view of a cultivator constructed in accordance with my invention.
Figure 2:
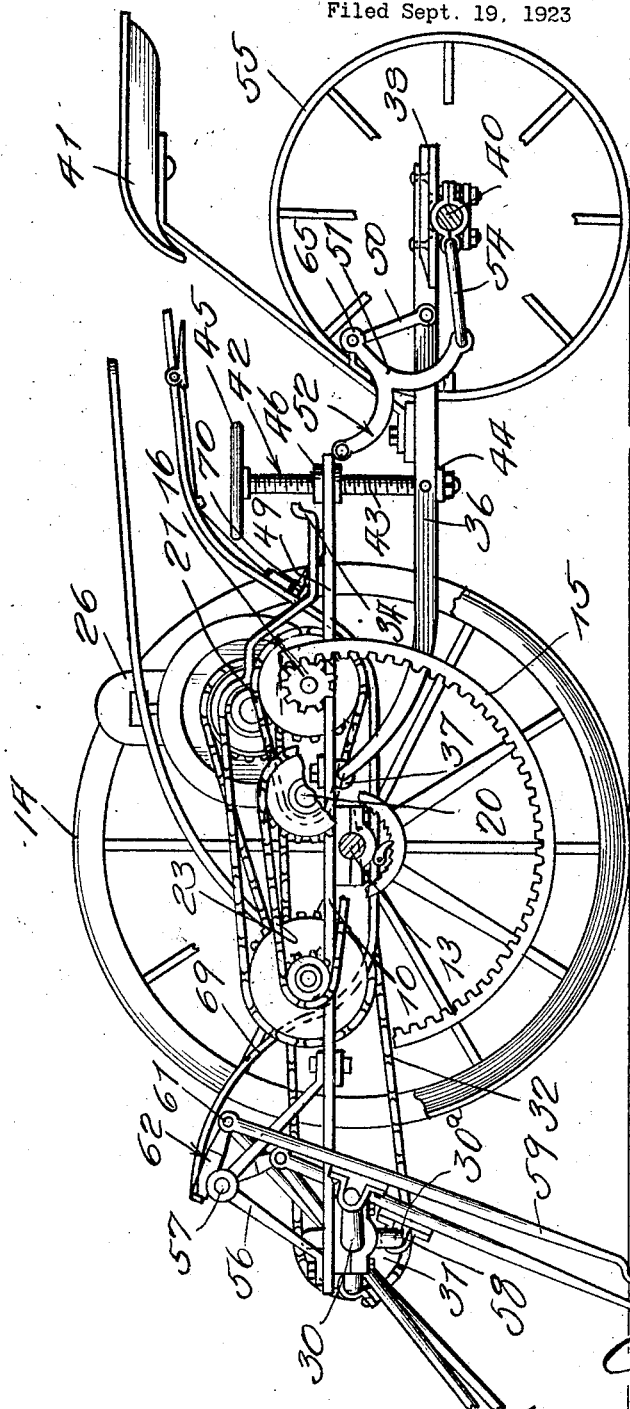
Figure 2 is a side elevation thereof, parts being broken away.

Referring now more particularly to the drawings, the numeral 10 indicates a body frame including spaced longitudinally extending side members 11 and a center member 12. Extending transversely of the frame approximately centrally thereof is an axle 13 upon the ends of which are mounted supporting wheels 14. Mounted upon the axle of the supporting wheels 14 is a gear 15 which meshes with a pinion 16 carried by a short shaft 17 mounted in a bearing 18 carried by the adjacent side member 11. Mounted in a bearing 19 carried by the side member 11 is a second short shaft 20 having a sprocket and chain connection with the shaft 17, as indicated at 21. Mounted in bearings carried by the center member 12 and said side member 11 is a third shaft 22 which has a sprocket and chain connection with the shaft 20, as indicated at 23, and has mounted thereon a fixed sprocket 24 and a clutch sprocket 25.

Mounted upon the frame is an operating engine 26, the engine shaft 27 of which is provided with a sprocket 28 aligning with the clutch sprocket 25 of the shaft 22 and a clutch sprocket 29 aligning with the fixed sprocket 24 of the shaft 22, these aligned sprockets being connected by suitable sprocket chains. Positioned at the forward end of the machine is a crank shaft 30 having thereon a fixed sprocket 31 which aligns with a clutch sprocket 32 upon the engine shaft 27 and whiich is connected with this clutch sprocket by a suitable sprocket chain. The clutch sprockets 32 and 29 are normally disengaged and may be thrown into engagement by means of pivoted levers 33 and 34, respectively, these levers being adapted for engagement by the foot of the operator and having their free ends positioned adjacent the rear end of the frame. It will be seen that when the lever 33 is forced forwardly the crank shaft 30 is thrown into operation and that when the lever 34 is thrown forwardly the wheel is connected with the drive to move the device over the ground. The purpose of the clutch 25 is to provide a further means of connection between the engine and the driving wheel allowing the highest speed of operation during movement of the device from place to place. When the clutch 25 is engaged the clutch 29 will, of course, be disengaged. The levers 33 and 34 are preferably of such construction that they will remain in adjusted position when the foot is released therefrom.

Arranged rearwardly of the main frame is a secondary or steering frame 35. This frame is shown in the present instance as comprising a pair of side members 36, each having its forward end pivotally connected to a side member 11 of the main frame, as indicated at 37. The rear ends of the frame members 36 are connected by a member 38 combining therewith to form one member of a fifth wheel structure, the other member 39 of which is carried by a wheel supported axle 40. This frame forms a support for the driver's seat 41 and for an adjusting mechanism 42 whereby the angle of the main frame 10 to the horizontal may be determined. This adjusting mechanism may assume any desired form. In the present instance I have illustrated the same as consisting of a threaded upright shaft 43 journaled in its lower end in a brace member 44 connecting the side members 36 of the frame 35 and having at its upper end a hand wheel 45 whereby it may be rotated. Mounted upon the shaft is a nut 46 having a groove 47 receiving the edges of a longitudinally extending slot 48 formed in the rear transverse frame member 49 of the main frame or an extension thereof.

Extending upwardly from the side members 36 in advance of the axle are rigid support members 50 to which are pivoted the bight portions 51 of bell crank levers 52. Each of these bell crank levers is provided at one end of the upper arm thereof with an inturned portion 53 for engagement by the foot of the operator. The other arm of the bell cranks is in each instance connected with the axle 40 at a point spaced from the pivot thereof by means of a rigid link 54. It will be seen that by depression of either of the foot portions 53 the corresponding side of the axle will be moved rearwardly causing the axle to shift about its pivot and the steering wheels 55 thereof accordingly to act to turn the complete machine. Mounted in bearings 56 supported from the side members 11 and from the central longitudinally extending member 12 of the main frame adjacent the crank shaft 30 thereof and slightly rearwardly and above this crank shaft is a straight shaft 57. Each crank 30$^a$ of the crank shaft 30 has mounted thereon by means of a shackle 58 the shank portion 59 of a hoe member 60 at a point spaced intermediate the ends of the hoe member. The shackles 28 each comprise a section 58$^a$ pivoted to the crank throw and a section 58$^b$ secured to the hoe shank 29, these sections being pivotally connected, as at 59, to one another. The ends of the hoe member are in each instance pivotally connected with an eye 61, which eye is in turn rotatably mounted, as at 62, in a bearing which is in turn rotatable, as indicated at 63, upon the shaft 57.

Arranged above the bearings 62 are shifting members 64. The hoe members are divided into two gangs, the right and left hand. The bearing members are similarly separated and a shifting member 64 is provided for each set of bearing members. These shifting members are each disclosed as comprising a length 64 of material, such as strap iron, provided at its ends with yokes 66 embracing the shaft 57 and abutting the outer face of the outermost bearing 62 of that set with which it coacts. The outer bearing 62 is held against movement with relation to the shifting member 64 by means of a stop 67 which abuts the opposite face thereof. Between the inner bearings of each set a collar 68 surrounds the shaft to hold the bearing members in spaced relation and the faces of the bearing members remote from the collar are abutted by a yoke 66 and a stop member 67.

It will be seen that the shifting member when shifted will shift with it longitudinally of the shaft 57 all of the bearing members of its particular set. This shifting is accomplished by means of control levers 69, the rear ends of which are arranged adjacent the driver's seat, these control levers being held in adjusted position in any desired manner, in the present instance shown as coacting with toothed segments 70.

It will be seen that by the use of a construction in accordance with the foregoing a tilting frame is provided having means for positively driving its supporting wheels and for driving an operating shaft for ground working implements carried thereby. It will further be seen that through the subframe the main frame may be readily steered and since the steering action is from the rear a short turn may be readily effected. In the operation of the hoe members the rotation of the crank shaft will cause the hoe members to be alternately elevated and thrust downwardly and the compound or universal pivotal connection of the upper ends of these hoe members with the shaft 57 will permit all necessary movement of such upper ends to compensate for the movement of the crank shaft. Many changes being possible in the arrangement of the structure hereinbefore set forth I do not limit myself to such specific structure as hereinbefore described except as hereinafter claimed.

I claim:—

1. In a cultivator, a supporting frame, a crank shaft arranged transversely of the frame, a shaft arranged above and rearwardly of the crank shaft, arms loosely mounted upon the shaft, hoes having the shanks thereof connected intermediate their ends to the throws of said crank shaft, a connection between the upper end of the hoe shank and said arms, the connections of said hoe shanks with said crank throws and with said arms permitting lateral shifting of the arms upon the shaft to thereby adjust the point of engagement of said hoes with the ground, and means for adjusting said arms upon said shaft.

2. In a cultivator, a supporting frame, a crank shaft arranged transversely of the frame, a shaft arranged above and rearwardly of the crank shaft, arms loosely mounted upon the shaft, hoes having the shanks thereof connected intermediate their ends to the throws of said crank shaft, a connection between the upper end of the hoe shank and the free ends of said arms, the connections of said hoe shanks with said crank throws and with said arms permitting lateral shifting of the arms upon the shaft to thereby adjust the point of engagement of said hoes with the ground, means for adjusting said arms upon said shaft including a shifting lever, a member shifted by the lever, and connections between said member and said arms preventing relative movement of the arms and said shifting members longitudinally of the shaft.

3. In a cultivator and in combination, a wheel supported frame, a shaft carried by the frame, arms loosely mounted on the shaft, hoes arranged in gangs pivoted to the arms at their upper ends, means engaging the hoe intermediate the ends thereof and permitting lateral swinging of the hoes for reciprocating the lower ends of the hoes and means engaging the arms for simultaneously shifting the upper ends of the hoes of each gang laterally.

4. In a cultivator and in combination, a wheel supported frame, a shaft carried by the frame, hoes arranged in gangs, the shanks of said hoes having connection with said shaft, permitting longitudinal movement of the shanks and transverse oscillation of the shanks about the point of connection, means for reciprocating the lower ends of the hoes including a crank shaft, pivotal connections between the shanks of the hoes intermediate their ends and the cranks of the shaft rotatably engaging the crank shaft, said connections permitting transverse oscillation of the hoe shanks and means for simultaneously shifting the upper ends of the hoes of each gang laterally.

In testimony whereof I hereunto affix my signature.

CHARLES R. DAVID.